US008429660B2

(12) United States Patent  (10) Patent No.: US 8,429,660 B2
Dweck et al.  (45) Date of Patent: Apr. 23, 2013

(54) SYSTEMS AND METHODS TO ALLOCATE APPLICATION TASKS TO A POOL OF PROCESSING MACHINES

(75) Inventors: Jay S. Dweck, Armonk, NY (US); Michael Fellows, Tokyo (JP); David G. Richard, Livingston, NJ (US); Mark T. Morrissey, Brooklyn, NY (US); Mary D Byron, Ridgewood, NJ (US)

(73) Assignee: Goldman, Sachs & Co., New York, NY (US)

( * ) Notice: Subject to any disclaimer, the term of this patent is extended or adjusted under 35 U.S.C. 154(b) by 1379 days.

(21) Appl. No.: 11/208,991

(22) Filed: Aug. 22, 2005

(65) Prior Publication Data

US 2006/0070078 A1   Mar. 30, 2006

Related U.S. Application Data

(60) Provisional application No. 60/603,612, filed on Aug. 23, 2004.

(51) Int. Cl.
*G06F 9/46* (2006.01)
*G06F 15/173* (2006.01)
*G06F 21/00* (2006.01)

(52) U.S. Cl.
USPC .............. 718/104; 718/106; 709/226; 705/52

(58) Field of Classification Search ................... 718/107, 718/1–106; 705/5, 80, 51–53, 7.22–7.26; 709/201, 202, 203, 220–226
See application file for complete search history.

(56) References Cited

U.S. PATENT DOCUMENTS

| | | | | |
|---|---|---|---|---|
| 5,408,663 A * | 4/1995 | Miller | ........................... | 718/104 |
| 5,640,569 A * | 6/1997 | Miller et al. | .................. | 710/241 |
| 5,898,870 A * | 4/1999 | Okuda et al. | .................. | 718/104 |
| 6,086,628 A * | 7/2000 | Dave et al. | ......................... | 716/7 |
| 6,370,560 B1 * | 4/2002 | Robertazzi et al. | ........... | 718/105 |
| 6,954,931 B2 * | 10/2005 | Shetty et al. | .................. | 718/104 |
| 7,146,353 B2 * | 12/2006 | Garg et al. | ........................... | 1/1 |
| 7,320,131 B1 * | 1/2008 | O'Toole, Jr. | ................... | 718/104 |
| 7,568,199 B2 * | 7/2009 | Bozak et al. | .................. | 718/104 |
| 7,640,547 B2 * | 12/2009 | Neiman et al. | ................ | 718/104 |
| 7,657,448 B2 * | 2/2010 | Reddy et al. | ...................... | 705/5 |
| 2002/0059427 A1 * | 5/2002 | Tamaki et al. | ................ | 709/226 |
| 2002/0116507 A1 * | 8/2002 | Manjure et al. | ............... | 709/229 |
| 2004/0039815 A1 * | 2/2004 | Evans et al. | ................... | 709/225 |
| 2004/0128384 A1 * | 7/2004 | Rolia et al. | .................... | 709/226 |
| 2004/0143833 A1 * | 7/2004 | Heyrman et al. | ............. | 718/100 |
| 2005/0050546 A1 * | 3/2005 | Remany et al. | ............... | 718/105 |
| 2005/0097560 A1 * | 5/2005 | Rolia et al. | .................... | 718/104 |
| 2005/0138618 A1 * | 6/2005 | Gebhart | ........................ | 717/176 |
| 2005/0165854 A1 * | 7/2005 | Burnett et al. | ................ | 707/200 |

* cited by examiner

*Primary Examiner* — Abdullah Al Kawsar
(74) *Attorney, Agent, or Firm* — Perkins Coie LLP

(57) ABSTRACT

Systems and methods are provided to allocate application tasks to a pool of processing machines. According to some embodiments, a requestor generates a scope request including an indication of a number of compute units to be reserved. The requestor also provides an application request associated with the scope. A subset of available processing machines may then be allocated to the scope, and the application request is divided into a number of different tasks. Each task may then be assigned to a processing machine that has been allocated to the application request. According to some embodiments, each task is associated with a deadline. Moreover, according to some embodiments an overall cost is determined and then allocated to the requestor based on the number of compute units that were reserved for the scope.

23 Claims, 15 Drawing Sheets

FIG. 6

| PROCESSING MACHINE IDENTIFIER 602 | MACHINE PARAMETERS 604 | COMPUTE UNITS 606 | CURRENT STATUS 608 | COST 610 |
|---|---|---|---|---|
| PM_101 | DUAL 1.4 GHZ INTEL 3 8 MEG RAM 10 GB HARD DRIVE | 1.0 | ASSIGNED SCOPE_101 | $1,000.00 PURCHASE PRICE |
| PM_102 | DUAL 3.4 GHZ INTEL 4 16 MEG RAM 20 GB HARD DRIVE | 3.6 | AVAILABLE | $2,000.00 PURCHASE PRICE |
| PM_103 | DUAL 2.0 GHZ AMD 8 MEG RAM 15 GB HARD DRIVE | 1.5 | ASSIGNED AR_106 | $1,500.00 PURCHASE PRICE |
| PM_104 | DUAL 1.4 GHZ INTEL 3 8 MEG RAM 10 GB HARD DRIVE | 1.0 | T_101_01 | $100.00/MONTH LEASE |
| PM_105 | 3.4 GHZ INTEL 4 16 MEG RAM 10 GB HARD DRIVE | 1.6 | FAILED | $1,300.00 PURCHASE PRICE |

| SCOPE IDENTIFIER 1202 | RESERVED COMPUTE UNITS 1204 | ALLOCATED COST 1206 |
|---|---|---|
| SCOPE_101 | 20 | $21,666.66 |
| SCOPE_102 | 10 | $10,833.33 |
| SCOPE_103 | 10 | $10,833.33 |
| SCOPE_104 | 100 | $108,333.33 |
| SCOPE_105 | 1000 | $1,083,333.33 |

FIG. 12

SYSTEMS AND METHODS TO ALLOCATE APPLICATION TASKS TO A POOL OF PROCESSING MACHINES

CROSS-REFERENCE TO RELATED APPLICATIONS

The present application claims the benefit of U.S. Provisional Application No. 60/603,612 entitled "Systems and Methods to Allocate Application Tasks to a Pool of Processing Machines" and filed Aug. 23, 2004. The entire content of that application is incorporated herein by reference.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to computer systems. In particular, the present invention relates to systems and methods to allocate application tasks to a pool of processing machines.

BACKGROUND

An enterprise might use a substantial number of computers to process data. In the financial area, by way of example, overnight risk reports, daily volatility information, and Current Value Assessment (CVA) and intra-day risk calculations might be performed using a hundreds of high-performance Personal Computers (PCs).

The use of such computers, however, can be expensive. For example, in some cases enterprise-class computers are used because they are more reliable than standard, commodity computers. Since enterprise-class computers use special components to achieve greater reliability (e.g., power supplies and hard disk drives), the costs associated with these computers is substantially increased.

Moreover, expensive Information Technology (IT) employees, such as system administrators, are required to create, update, and fix computers. For example, one system administrator might be required for every one hundred computers. An enterprise that uses thousands of computers would therefore need a significant number of IT employees.

In addition, an enterprise might be located in an expensive location. The headquarters of a financial enterprise, for example, might be located in a downtown office building so that traders and other employees can be near financial markets and similar institutions. Thus, the per-square-foot rent and electrical costs associated with housing and powering thousands of computers can be significantly more expensive as compared to other locations.

SUMMARY

To alleviate problems inherent in the prior art, the present invention introduces systems and methods to allocate application tasks to a pool of processing machines.

According to some embodiments, a scope request is received from a requestor, including an indication of a number of compute units to be reserved for a scope. An application request associated with the scope is also received from the requestor. A number of compute units associated with the application request is determined and a subset of available processing machines from a pool of processing machines is allocated to the application request, wherein a number of compute units associated with the subset is greater than the number of compute units associated with the application request, and wherein other processing machines from the pool are allocated to other application requests associated with other scopes. The application request is then divided into a plurality of tasks, and a deadline is associated with each task. Each task is assigned to a processing machine in the subset, and, if a processing machine does not complete the task before the deadline, the task is re-assigned to another processing machine in the subset. According to some embodiments, a cost is allocated to the requestor, wherein the allocated cost is based at least in part on (i) a cost associated with the entire pool of processing machines and (ii) the number of compute units reserved for the scope.

Another embodiment comprises: means for receiving from a requester a scope request including an indication of a number of compute units to be reserved for a scope; means for receiving an application request associated with the scope; means for determining a number of compute units associated with the application request; means for allocating a subset of available processing machines from a pool of processing machines to the application request, wherein a number of compute units associated with the subset is greater than the number of compute units associated with the application request, and wherein other processing machines from the pool are allocated to other application requests associated with other scopes; means for dividing the application request into a plurality of tasks; means for associating a deadline with each task; means for assigning each task to a processing machine in the subset; if a processing machine does not complete the task before the deadline, means for re-assigning the task to another processing machine in the subset; and means for allocating a cost to the requester, wherein the allocated cost is based at least in part on (i) a cost associated with the entire pool of processing machines and (ii) the number of compute units reserved for the scope.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 6 is a tabular representation of a portion of a pool database according to one embodiment of the present invention.

FIG. 12 is a tabular representation of a portion of a scope cost database according to one embodiment of the present invention.

DETAILED DESCRIPTION

Some embodiments of the present invention are associated with "processing machines." As used herein, the phrase "processing machine" may refer to any type of computing device, including Personal Computers, servers, mobile computers, and boards that contain one or more Central Processing Units (CPUs).

System

Figure 1:
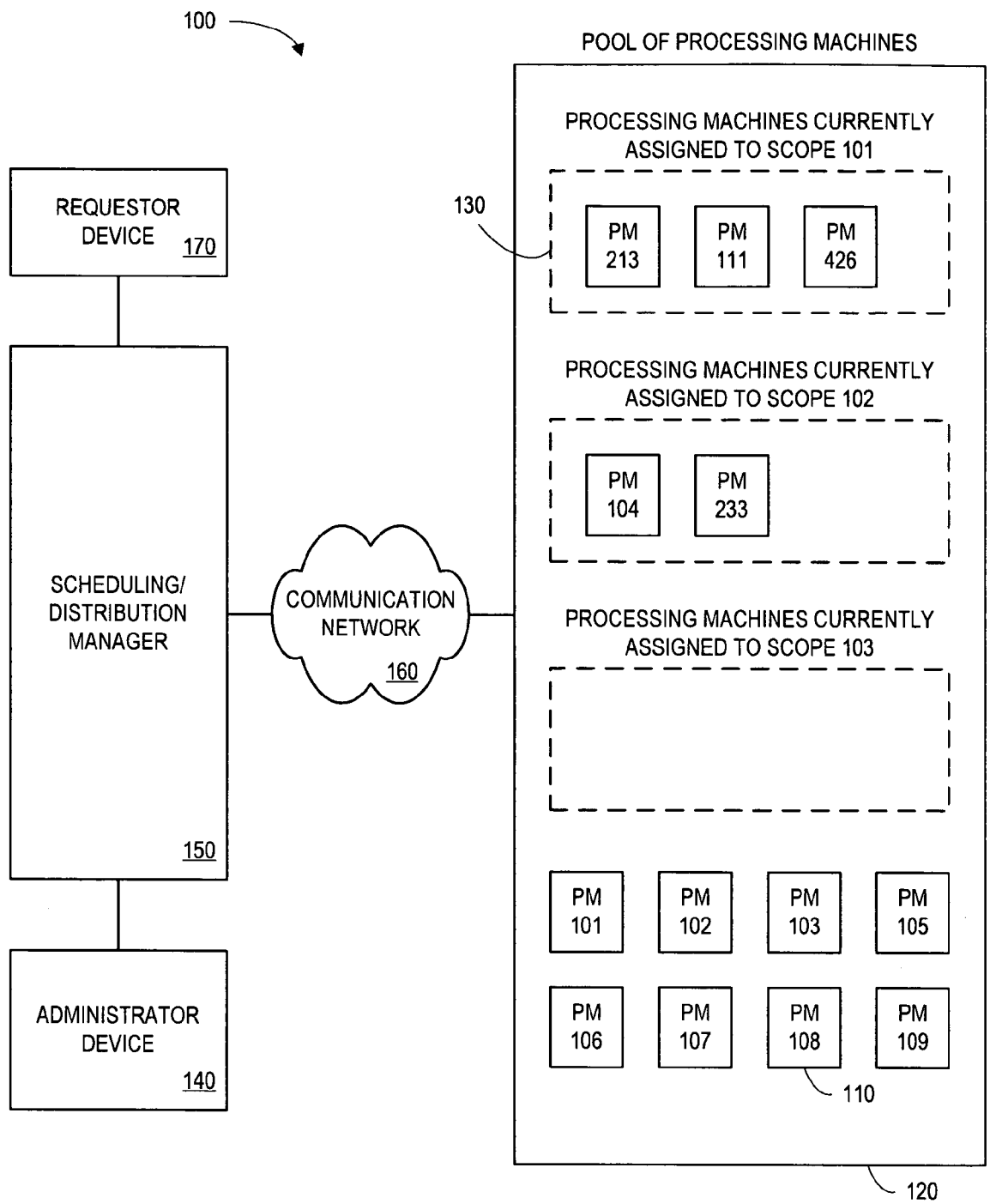
FIG. 1 is a block diagram overview of a system according to some embodiments.

FIG. 1 is a block diagram overview of a system 100 according to some embodiments. The system 100 includes a number of processing machines 110 in a pool 120. Each processing machine 110 might represent, for example, a board that contains one or more CPUs (and number of these boards could be mounted in a processing cabinet). Note that such a board might not need a display monitor, printer, keyboard, or computer mouse. The system 100 also includes a scheduling/distribution manager 150 that can exchange information with each processing machine 110 via a communication network 160, such as an Ethernet or Internet Protocol (IP) network. Note that the communication network 160 may be any type of network and might include a number of different networks, such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments, a requestor may use a requester device 170 to transmit a scope request to the scheduling/distribution manager 150. Consider, for example, an enterprise having a number of different divisions (e.g., a trading division, a sales division, and a human resources division). At the beginning of the year, each division estimates how much processing power it will need during the year and transmits that information to the scheduling/distribution manager 150 in a scope request. The scheduling/distribution manager 150 (or an administrator associated with the scheduling/distribution manager) can then use the scope requests to determine if the pool 120 has enough processing machines 110 to service all of the divisions.

According to some embodiments, "compute units" are used to define an amount of processing power. As used herein, the phrase "compute unit" may represent any quantifiable parameter associated with a processing machine 110. By way of example, a single compute unit might be defined as the processing power of a board that has two 1.4 Gigahertz (GHz) INTEL Pentium® III processors. In this case, a board that has four 2.5 GHz INTEL Pentium® IV processors might be considered to have 5.9 compute units of processing power. Other parameters in addition to (or instead of) the number of processors and the processor speed could also be considered when defining a compute unit (e.g., an amount of memory or hard disk drive storage).

A requestor may also transmit an application request to the scheduling/distribution manager 150. For example, a requester might need to execute a financial risk model application. The scheduling/distribution manager 150 will then allocate an appropriate number of processing machines 110 from the pool to the scope 130 associated with that requester and/or application request. For example, three processing machines (PM 213, PM 111, and PM 426) have been assigned to SCOPE_101 illustrated in FIG. 1.

When another application request is received by the scheduling/distribution manager 150, it can then select an appropriate number of available processing machines 110 from the pool for the new scope (e.g., from among the processing machines 110 that are not already assigned to a scope). Note that if no application request is received in connection with a scope, no processing machines 110 might be assigned to that scope.

The requestor and/or the scheduling/distribution manager 150 may also divide an application request into a plurality of smaller tasks. For example, a first task might be associated with one function and a one set of data while a second task is associated with a different function and/or different set of data. The scheduling/distribution manager 150 then arranges for each task to be assigned to a processing machine 110 in the scope 130. The processing machines 110 then execute the tasks and, as a result, the application request is serviced.

Although a single scheduling/distribution manager 150 and requestor device 170 are illustrated in FIG. 1, the system 100 may include any number of these devices. Moreover, different devices illustrated in FIG. 1 might be incorporated into a single device. For example, the scheduling/distribution manager 150 and an administrator device 140 (e.g., used to access and/or adjust information associated with the scheduling/distribution manager 150 and pool 120) might be included in a single server.

Requestor Method

Figure 2:
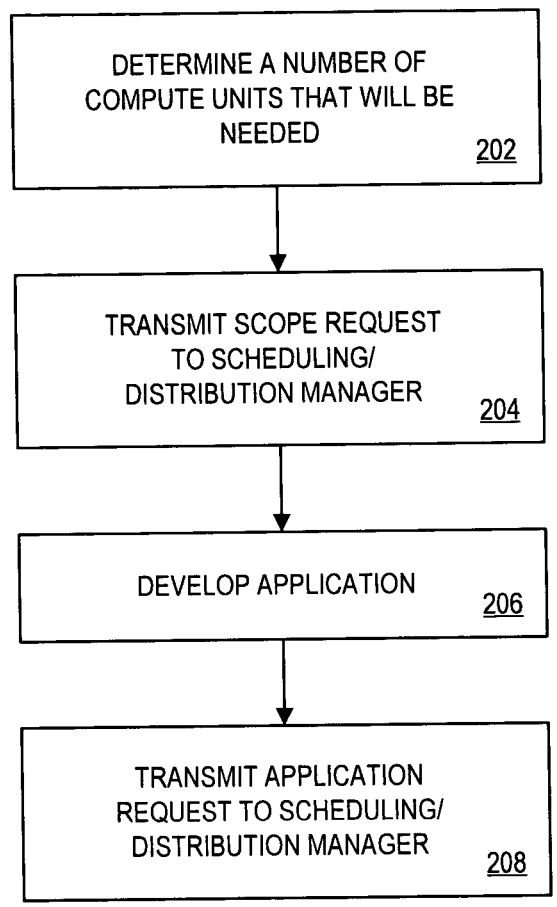
FIG. 2 is a flow chart of a requester method according to some embodiments.

FIG. 2 is a flow chart of a requester method according to some embodiments. The method may be performed, for example, by or via a requester device 170. The flow charts described herein do not imply a fixed order to the steps, and embodiments of the present invention may be practiced in any order that is practicable.

At 202, the requestor determines a number of compute units that will be needed. According to some embodiments, this simply means that the requester estimates a number of standard PCs that it needs. In addition to a number of compute units, the requestor might indicate a period of time associated with the request. For example, the requestor might indicate that it needs forty standard PCs for the next three months.

A scope request including this information is transmitted to the scheduling/distribution manager 150 at 204. The scope request might be transmitted electronically or in any other form.

At 206, an application is developed. Some considerations associated with the development of applications are described with respect FIG. 14. At 208, an application request is transmitted to the scheduling/distribution manager 150. The application request might include the application itself, a pointer to the application, a number of compute units that should be assigned to the application, and/or a deadline indicating when the application request should be serviced. The requestor may later receive or retrieve a result after the application request has been serviced (e.g., by receiving a report).

Scheduling/Distribution Manager Method

Figure 3:
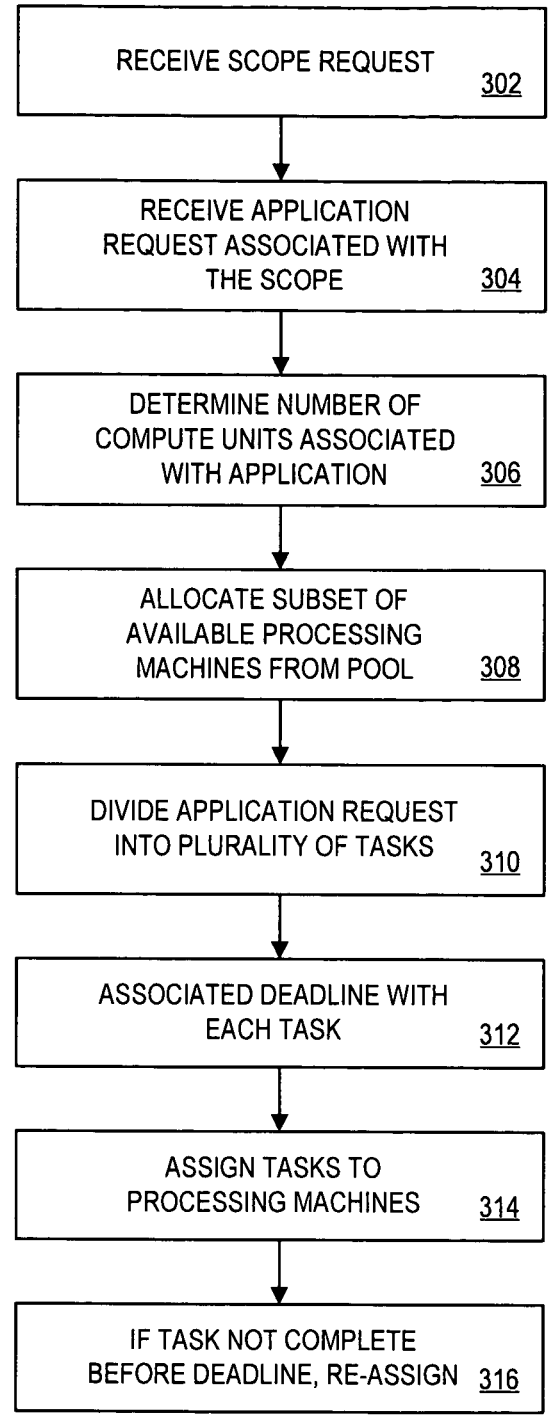
FIG. 3 is a flow chart of a scheduling/distribution manager method according to some embodiments.

FIG. 3 is a flow chart of a scheduling/distribution manager 150 method according to some embodiments. At 302, a scope request is received from a requester and/or requestor device 170. The scope request might include, for example, a number of compute units that should be reserved for the scope along with a time period (e.g., two hundred compute units should be reserved for the next three years). According to some embodiments, the scope request adjusts a previously established scope (e.g., by adding ten compute units or extending a subscription period). The scheduling/distribution manager 150 may then establish the scope (e.g., and make sure that the current pool 120 includes a sufficient number and/or quality of processing machines 110).

At 304, an application request associated with the request is received by the scheduling/distribution manager 150. The application request might include, for example, an application program or a pointer to an application program.

At 306, a number of compute units associated with the application is determined. According to some embodiments, the received application request includes an indication of the appropriate number of compute units (e.g., "service this application request using five compute units"). According to another embodiment, the scheduling/distribution manager 150 and/or administrator analyzes the application request to determine an appropriate number of compute units. According to some embodiments, the number of processing machine 110 that are allocated is larger than the number that should normally be requested to service the application. By way of example, an extra twenty percent of compute units might be allocated to ensure that sufficient processing power will be available even when some the processing machines 110 fail while the application request is being serviced.

At 308, a subset of available processing machines 110 are assigned to the application request and/or scope. For example, the scheduling/distribution manager 150 may assign five PCs that are not currently being used by another application request and/or scope.

At 310, the application request is divided into a number of tasks. According to some embodiments, the received application request included a list of appropriate tasks (e.g., as determined by an application developer or programmer). According to another embodiment, the scheduling/distribution manager 150 and/and administrator analyzes the application request to determine an appropriate number of tasks and/or what each tasks should be.

At 312, a deadline is associated with each task. The deadline might be, for example, a default deadline (e.g., ten hours), a deadline requested in a scope request or application request, and/or information about a particular processing machine 110 or task (e.g., this task should take no longer than five hours).

At 314, the scheduling/distribution manager 150 assigns each task to one of the processing machines 110 that were allocated to the application request. For example, the scheduling/distribution manager 150 might automatically configure and build a processing machine 110 with the software appropriate to perform the task. Note that the number of processing machines 110 that are assigned to work on a particular application request may not equal the number of compute units associated with that request (e.g., because a single processing machine 110 might be able to perform twice as much work as a standard compute unit).

If the task has not been completed by the deadline at 316, the scheduling/distribution manager 150 re-assigns the task to another processing machine 110. For example, if a processing machine 110 fails while executing a task no result will be generated. In this case, the scheduling/distribution manager 150 can re-assign the task to another processing machine 110 that has not failed.

Processing Machine Method

Figure 4:
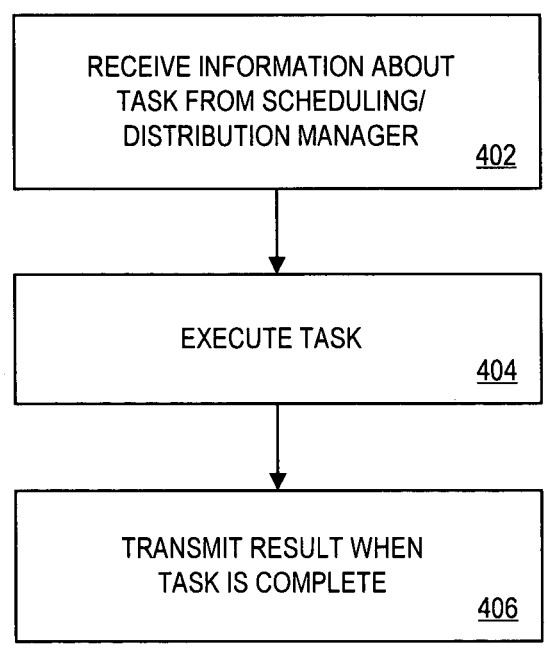
FIG. 4 is a flow chart of a processing machine method according to some embodiments.

FIG. 4 is a flow chart of a processing machine 110 method according to some embodiments. At 402, information about a task is received from the scheduling/distribution manager 150. The information might include, for example, a task, a point to a task, a deadline, and/or other information about task (e.g., build information needed to perform the task). At 404, the task is executed by the processing machine 110.

At 406, a result is transmitted by the processing machine 110 after the task has executed. The result might be, for example, transmitted to the requestor device 170, the scheduling/distribution manager 150, and/or be stored in a predetermined location. According to some embodiments, the processing machine 110 also transmits an indication that the task has been successfully completed to the scheduling/distribution manager 150 (e.g., indicating that the task does not need to be re-assigned).

Scheduling/Distribution Manager

Figure 5:
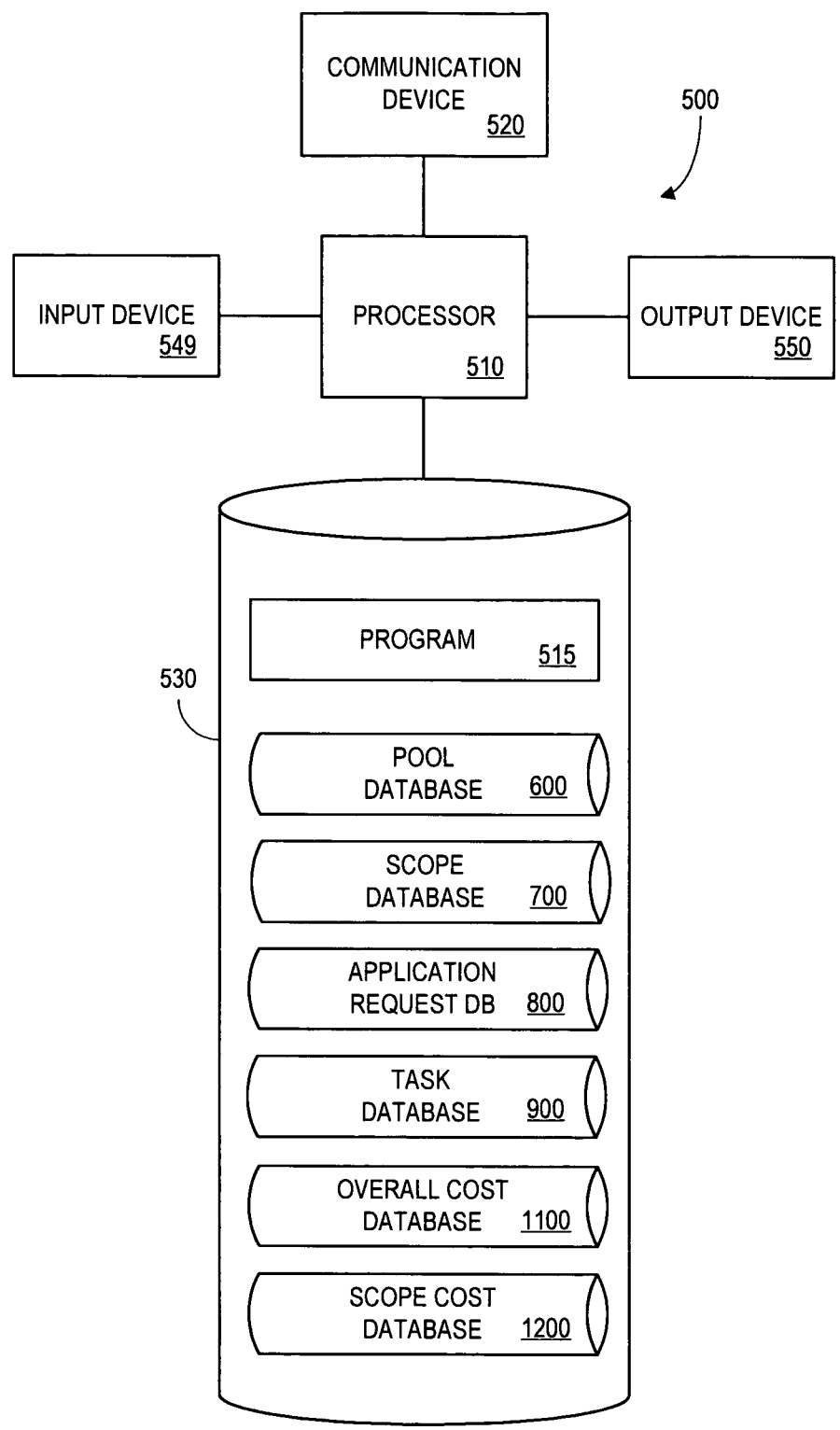
FIG. 5 is a block diagram overview of a scheduling/distribution manager according to some embodiments.

FIG. 5 is a block diagram overview of a scheduling/distribution manager 500 according to some embodiments. The scheduling/distribution manager 500 comprises a processor 510, such as one or more INTEL Pentium® processors, coupled to a communication device 520 configured to communicate via, for example, a communication network. The communication device 520 may be used to communicate, for example, with one or more processing machines 110 and/or requester devices 170. According to one embodiment, the communication device 520 is also used to communicate with other scheduling/distribution managers.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory such as RAM devices and Read Only Memory (ROM) devices.

The storage device 530 stores a program 515 for controlling the processor 510. The processor 510 performs instructions of the program 515, and thereby operates in accordance with the present invention. For example, the processor 510 may receive and service application requests according to any of the embodiments described herein.

As used herein, information may be "received" by or "transmitted" to, for example: (i) the scheduling/distribution manager 500, a processing machine 110, a requester device 170, and/or an administrator device 140; or (ii) a software application or module within the scheduling/distribution manager 500 from another software application, module, or any other source.

As shown in FIG. 5, the storage device 530 also stores: a pool database 600 (described with respect to FIG. 6); a scope database 700 (described with respect to FIG. 7); an application request database 800 (described with respect to FIG. 8); a task database 900 (described with respect to FIG. 9); an overall cost database 1100 (described with respect to FIG. 11); and a scope database 1200 (described with respect to FIG. 12).

Examples of other databases that may be used in connection with the scheduling/distribution manager 500 will now be described in detail with respect to FIGS. 6 through 9, 11, and 12. The illustrations and accompanying descriptions of the databases presented herein are exemplary, and any number of other database arrangements could be employed besides those suggested by the figures. Moreover, the data provided in each database is merely for illustration (and data might not be consistent from one FIG. to another).

Pool Database

FIG. 6 is a tabular representation of a portion of the pool database 600 that may be stored at the scheduling/distribution manager 150 according to one embodiment of the present invention. The table includes entries describing the pool 120 of processing machines 110. The table also defines fields 602, 604, 606, 608, 610 for each of the entries. The fields specify: a processing machine identifier 602, machine parameters 604, compute units 606, a current status 608, and a cost 610. The information in the pool database 600 may be created and updated, for example, based on information received from an administrator and/or the processing machines 110 (e.g., a processing machine 110 might provide configuration information to the scheduling/distribution manager 150 upon start-up).

The processing machine identifier 602 may be, for example, an alphanumeric identifier associated with a particular processing machine 110. The machine parameters 604 describe the computing ability of that processing machine 110. The parameters 604 might include, for example, how many processors the machine has, a clock speed, a processor type (e.g., 34 or 64 bit), an amount of RAM, an amount of ROM, an amount of storage, and/or an industry or benchmark rating.

The compute units 606 translates the machine parameters into a standard number that can be used to compare and allocate processing machines 110 with different characteristics. For example, a processing machine 110 with dual 1.4 GHz INTEL Pentium III processor might be defined as "1.0" compute units. According to some embodiments, no processing machines 110 in the pool 120 will have less than this amount of processing ability.

The current status 608 might indicate, for example, that a processing machine 110 has failed or is powered off. The status 608 might also indicate a scope, application request, and/or task that is currently associated with the processing machine 110. The cost 610 might include any type of cost information as described in more detail with respect to FIGS. 10-12.

Scope Database

Figure 7:
FIG. 7 is a tabular representation of a portion of a scope database according to one embodiment of the present invention.

FIG. 7 is a tabular representation of a portion of the scope database 700 that may be stored at the scheduling/distribution manager 150 according to one embodiment of the present invention.

The table includes entries describing scopes that have been established. The table also defines fields 702, 704, 706, 708, 710, 712 for each of the entries. The fields specify: a scope identifier 702, a requester 704, reserved compute units 706, a subscription period 708, a current assignment 710, and currently used compute units 712. The information in the scope database 700 may be created and updated, for example, based on scope requests and/or information received from an administrator.

The scope identifier 702 may be, for example, an alphanumeric identifier associated with a scope (e.g., as assigned by the scheduling/distribution manager 150 or the requestor). The requester 704 may indicate a division, department, or other body associated with the scope.

The reserved compute units 706 indicate an amount of computing ability that is associated with the scope. The reserved compute units 706 might indicate, for example, that the scope will need the equivalent of ten compute units for the next three years. By summing all of the reserved compute units 706 in the table 700 and comparing the result with the sum of the compute units 606 in the pool database 600 it can be determined whether or not the current pool 120 of processing machines 110 is appropriate (e.g., and whether or not processing machines 110 should be removed, added, and/or replaced with newer machines).

The subscription period 708 indicates a period of time associated with the scope. The period 708 might indicate, for example, a number of hours or days, or "open" (e.g., open-ended). According to some embodiments, the subscription period is also associated with a time of day, a time of month, and/or a time of year. For example, a requestor might provide a subscription asking for 500 compute units between midnight and 5:00 AM in the fourth quarter of each year for the next five years.

The current assignment 710 might indicate one or more application requests, processing machines 110, and/or tasks that are currently associated with the scope. The currently used compute units 712 might indicate how may compute units are associated with those assignments (e.g., to ensure that the scope does not exceed the compute units it asked for in the scope request).

According to one embodiment, the compute units associated with a scope represent a maximum number of compute units that can be assigned to the scope at one time. In this case, the scheduling/distribution manager 150 may determine if the currently used compute units 712 exceeds the reserved compute units 706. According to another embodiment, a compute unit instead represents an amount of processing that can be performed by a standard processor in a predetermined period of time (e.g., the amount of processing that a 3.0 GHz AMD processor can perform in one hour). In this case, the reserved compute units 706 might instead be a maximum number of compute unit time units that can be assigned to the scope during the subscription period 708. For example, a requestor that reserved five thousand compute unit hours might either: (i) use five thousand standard machines for one hour or (ii) use one hundred machines, each having five compute units, for ten hours.

Application Request Database

Figure 8:
FIG. 8 is a tabular representation of a portion of an application request database according to one embodiment of the present invention.

FIG. 8 is a tabular representation of a portion of the application request database 800 that may be stored at the scheduling/distribution manager 150 according to one embodiment of the present invention. The table includes entries describing application requests that have been or are being serviced by the scheduling/distribution manager 150. The table also defines fields 802, 804, 806, 808, 810, 812 for each of the entries. The fields specify: an application request identifier 802, a requestor 804, a scope identifier 806, tasks 808, current assignment 810, and a status 812. The information in the application request database 800 may be created and updated, for example, based on application requests and/or information received from an administrator.

The application request identifier 802 may be, for example, an alphanumeric identifier associated with an application that the requestor 804 would like to have serviced in connection with a particular scope identifier 806.

The tasks 808 indicate a number of smaller tasks associated with the application request 808 and the current assignment 810 may indicate the processing machine 110 that is executing that task. Consider, for example, the first entry in FIG. 8. In this case, the application request has been divided into three tasks and each task has been assigned to a processing machine 110. The status 812 might indicate that the application request is "in process" (e.g., at least one of the tasks is still being executed), "pending" (e.g., has not yet started to be serviced), or "complete (e.g., all of the tasks have been executed).

Task Database

Figure 9:
FIG. 9 is a tabular representation of a portion of a task database according to one embodiment of the present invention.

FIG. 9 is a tabular representation of a portion of the task database 900 that may be stored at the scheduling/distribution manager 150 according to one embodiment of the present invention. The table includes entries describing tasks that have been or are being executed. The table also defines fields 902, 904, 906, 908, 910 for each of the entries. The fields specify: a task identifier 902, an assigned processing machine 904, a deadline 906, a status 908, and a result 910. The information in the task database 900 may be created and updated, for example, based on application requests and/or information received from an administrator.

The task identifier 902 may be, for example, an alphanumeric identifier associated with a particular task and the assigned processing machine 904 identifies the processing machine that is associated with that task. The deadline 906 might indicate a day, time, or time period associated with the completion of the task. The status 908 might indicate that the task is "complete" (e.g., has been completely executed) or "in process" (e.g., is still being executed). The result 910 might be a file, pointer, or other information that has been generated during execution of the task.

Cost Allocation

Figure 10:
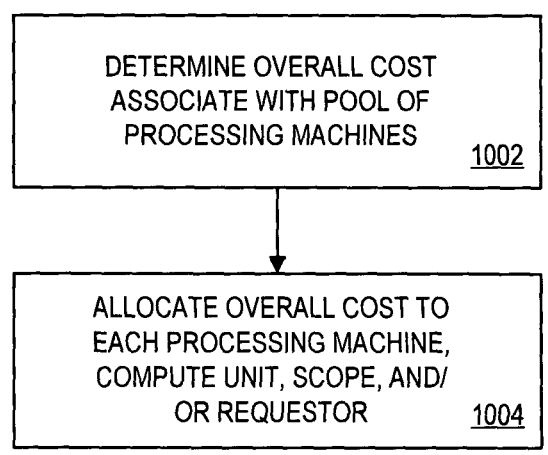
FIG. 10 is a flow chart of a cost allocation method according to some embodiments.

FIG. 10 is a flow chart of a cost allocation method according to some embodiments. At 1002, an overall cost associated with the pool 120 of processing machines 110 is determined. The cost might include, for example, capital costs (e.g., how much it cost to purchase the machine and/or software), occupancy costs (e.g., rent), a power cost (e.g., paid to an electric utility), cooling costs, and/or an administrative cost (e.g., information technology employee salaries).

At 1004, a cost is allocated to a requestor. In particular, the allocated cost is based at least in part on (i) a cost associated with the entire pool of processing machines and (ii) the number of compute units reserved for the scope. For example, if the pool 120 represented ten thousand processing units and a scope having one thousand processing units was requested, the requester associated with that scope might be allocated ten percent of the overall cost associated with the pool 120.

Overall Cost Database

Figure 11:
FIG. 11 is a tabular representation of a portion of an overall cost database according to one embodiment of the present invention.

FIG. 11 is a tabular representation of a portion of the overall cost database 1100 that may be stored at the scheduling/distribution manager 150 according to one embodiment of the present invention. The table includes an entry that describes the costs associated with a pool 120 of processing machines 110. The table also defines fields 1102, 1104, 1106, 1108, 1110, 1112 for each of the entries. The fields specify: an overall capital cost 1102, an overall occupancy cost 1104, an overall power cost 1106, an overall administrative cost 1108, a total number of compute units 1110, and a cost-per-compute unit 1112. The information in the overall cost database 1100 may be created and updated, for example, based on information received from an administrator and/or an accounting department.

The overall capital cost 1102 might represent, for example, an amount of money required to purchase all of the processing machines 110 in the pool 120. The overall capital cost 1102 might be calculated, for example, by summing all of the costs 610 in the pool database 600. The overall occupancy cost 1104 might represent, for example, an amount of rent that was paid for the space that is used to house the pool 120. Note that the space can be remote from the requester (e.g., the requestor might be in an expensive downtown area while the pool 120 is located in a less expensive area). The overall power cost 1106 might represent, for example, the cost associated with supplying power to all of the processing machines 110). The overall administrative cost 1108 might represent, for example, the salaries and other costs associated with employees who service the processing machines 110.

The total number of compute units 1110 may represent the processing power associated with all of the processing machines 110 in the pool. The total number of compute units 1110 might be calculated, for example, by summing all of the compute units 606 in the pool database 600. The cost-per-compute unit 1112 represents the overall cost (e.g., the sum of the costs 1102, 1104, 1106, 1108) divided by the total number of compute units 1110.

Scope Cost Database

FIG. 12 is a tabular representation of a portion of the scope cost database 1200 that may be stored at the scheduling/distribution manager 150 according to one embodiment of the present invention. The table includes entries describing costs that are allocated to each scope. The table also defines fields 1202, 1204, 1206 for each of the entries. The fields specify: a scope identifier 1202, a reserved compute units 1204, and an allocated cost 1206. The information in the scope cost database 1200 may be created and updated, for example, based on scope requests and information received from an administrator and/or an accounting department.

The scope cost identifier 1202 may be, for example, an alphanumeric identifier associated with a particular scope and may be based on, or associated with, the scope identifier 702 described with respect to the scope database 704. The reserved compute units 1204 indicates how many compute units are reserved for that scope (e.g., and may be equal to the reserved compute units 706 in the scope database 708). The allocated cost 1206 represents the reserved compute units 1204 multiplied by the cost per compute unit 1112 described with respect to FIG. 11.

According to another embodiment, the cost is instead allocated based on the compute units that were actually used by a scope (e.g., based on the history of the currently used compute units 712 in the scope database 700).

Example Display

Figure 13:
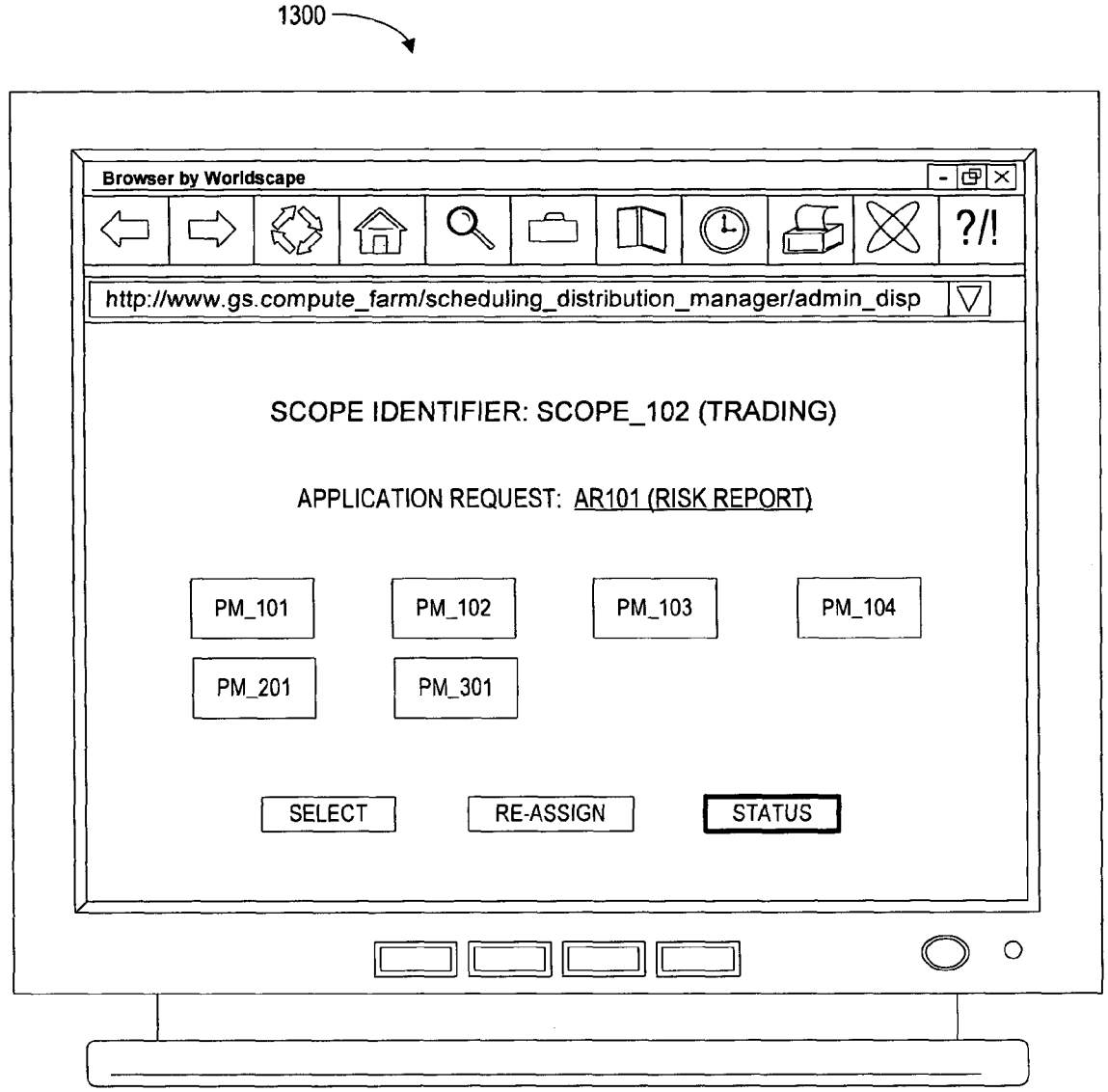
FIG. 13 illustrates a display according to one embodiment of the present invention.

FIG. 13 illustrates a display 1300 according to one embodiment of the present invention. The display 1300 might be associated with, for example, the administrator device 140 described with respect to FIG. 1 and may be used by an administrator to review and/or adjust the pool, scopes, application requests, tasks, results, and/or costs associated with the scheduling/distribution manager 150.

Roles and Responsibilities

Figure 14:
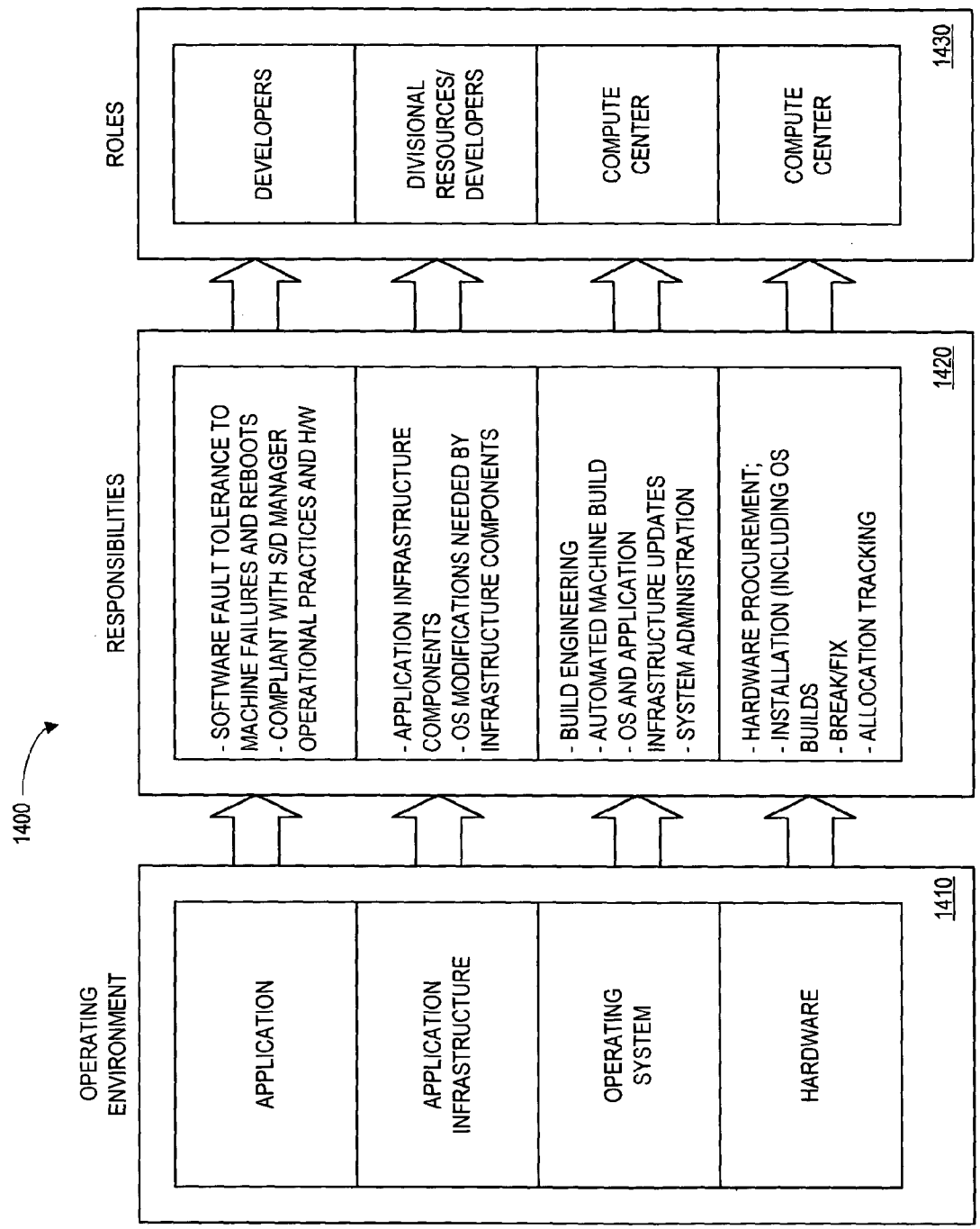
FIG. 14 illustrates some roles and responsibilities associated with a compute center according to some embodiments.

FIG. 14 illustrates some roles and responsibilities 1400 associated with a compute center according to some embodiments. In particular, an operating environment 1410 may include hardware (e.g., the processing machines 110 and the scheduling/distribution manager 150), an operating system, an application infrastructure, and one or more applications. With respect to the hardware, the role 1430 of a compute center might include the following responsibilities 1420: (i) procuring the hardware, (ii) installing and creating builds, (iii) fixing a processing machine 110 when it breaks, and/or (iv) tracking the allocation of processing machines 110 and/or costs. With respect to the hardware, the role 1430 of the compute center might include the following responsibilities 1420: (i) build engineering, (ii) establishing an automated machine build system, (iii) updating Operating Systems (OS), applications, and drivers as appropriate, and/or (iv) the system administration functions.

With respect to the application infrastructure, the role 1430 of divisional resources and/or application developers might include the following responsibilities 1420: (i) creating application infrastructure components, and (ii) modifying the OS for the application infrastructure components.

With respect to the applications themselves, the role 1430 of developers might include the following responsibilities 1420: (i) writing resilient (e.g., fault tolerant) code with respect to processing machine 110 failures and/or re-boots, and (ii) ensuring that the code complies with operational practices and hardware. By way of example, since a task might be executed by any of a number of different processing machines 110 (and may even be moved from one machine to another), the application code should be free of dependencies on a fixed machine address. Moreover, according to some embodiments, the amount of data exchange while is task is executing might be limited and no persistent state might exist on a local processing machine.

Computer Center Architecture

Figure 15:
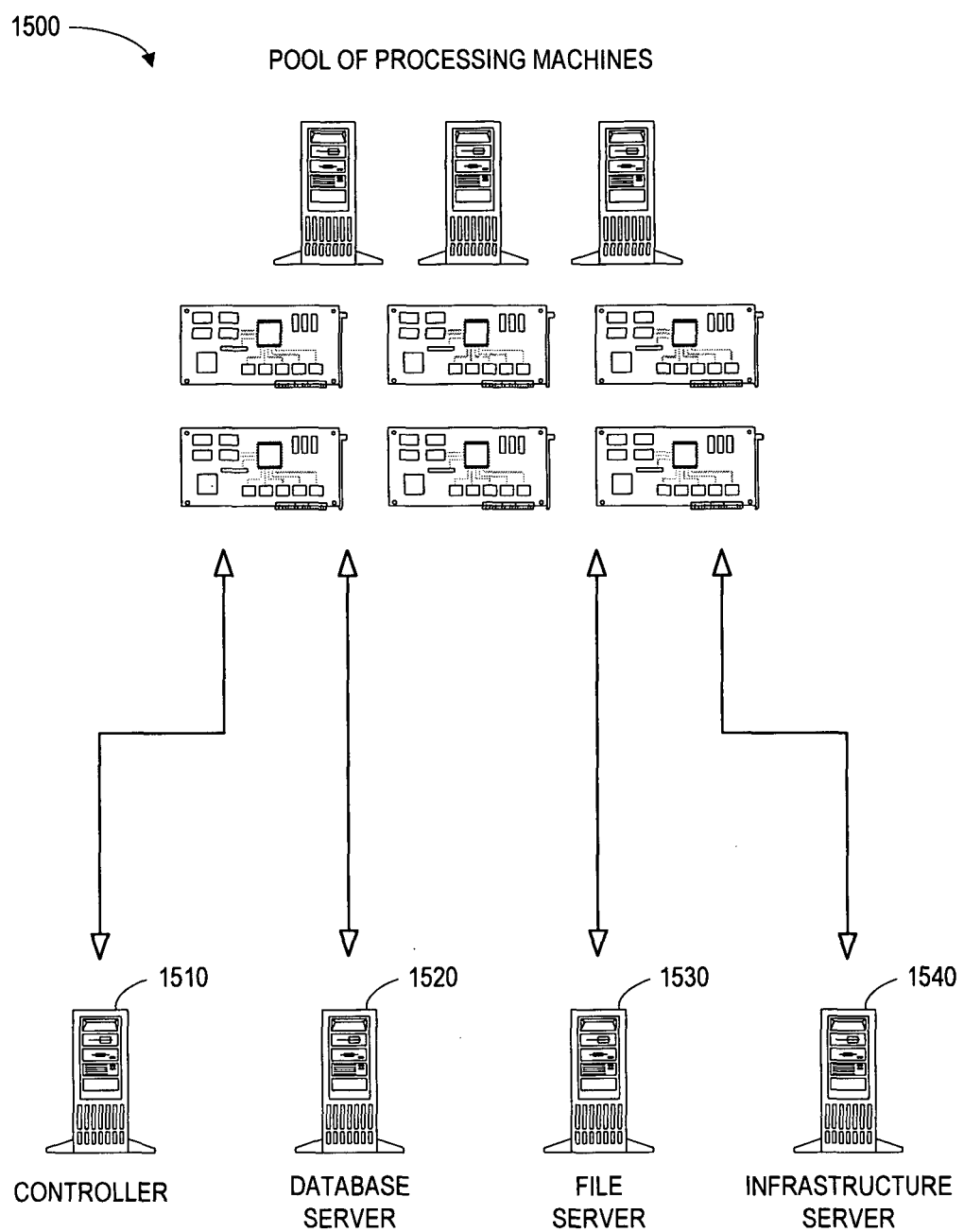
FIG. 15 illustrates a compute center architecture according to some embodiments.

FIG. 15 illustrates a compute center architecture 1500 according to some embodiments. In particular, a controller 1510, a database server 1520, a file server 1530, and an infrastructure server 1540 may exchange information with a pool of processing machines.

The controller 1510 might, for example, monitor running applications and tasks (e.g., generating alerts and/or logs when a fault is detected). The controller 1510 might also re-start applications and/or tasks when a fault is detected (e.g., a deadline is missed). According to some embodiments, the controller 1510 also load balances applications and tasks that are being executed by the processing machines.

The database server 1520 might, for example, provide persistent database information that can be read from (or written to) by a scope. The database server 1520 might be a Structured Query Language (SQL) database and could include: (i) an initial load of information to be pulled into an application, (ii) data to be retrieved periodically, and/or (iii) information written to the database server 1520 as the result(s) of processing.

The file server 1530 might, for example, store applications (e.g., executables), application data, configuration files associated with processing machines, and/or temporary files.

The infrastructure server 1540 might, for example, perform some of the following functions: Domain Name System (DNS) location and translation, Dynamic Host Configuration Protocol (DHCP) processing, and/or Network Information System (NIS) naming and administration.

Thus, embodiments of the present invention may provide a cost effective environment for running applications. Moreover, since the scheduling/distribution manager 150 can monitor and re-assign the resilient, distributed software tasks as appropriate, commodity processing boards can be used to provide a reliable system at a reduced cost as compared to enterprise-class computers. That is, when a board fails the task can simply be moved to another board and the location of the failed board can be flagged so that it can be swapped out later. In addition, the approach is scalable (e.g., increasing the number of processing units will not cause a significant change to the system).

Note that according to some embodiments, different processing machines can be associated with a scope over time. Moreover, the total number of processing machines associated with a scope might be reduced, but the compute units available to scope will remain the same (e.g., as newer, more powerful boards replace older ones). The increased savings associated with a reduced number of processing machines can then be passed on to requestors.

Additional Embodiments

The following illustrates various additional embodiments. These do not constitute a definition of all possible embodiments, and those skilled in the art will understand that the present invention is applicable to many other embodiments.

Further, although the following embodiments are briefly described for clarity, those skilled in the art will understand how to make any changes, if necessary, to the above-described apparatus and methods to accommodate these and other embodiments and applications.

Some embodiments have been described with respect to a single cost-per-compute unit being applied to all requestors. Embodiments, however, can allocate costs in any number of different ways. For example, a requester who subscribes to a scope for a relatively long period of time (e.g., three years) might be allocated less of the overall cost as compared to a requester who subscribed for a relative short period of time (e.g., two days). Similarly, a "penalty" might be applied if a requester uses more compute units than it had reserved (and a discount might be provided for requesters that does not use as much as it thought it would need).

According to some embodiments, a request may provide a scope request that includes a minimum and a maximum number of compute units that should be assigned to a scope and/or application request. Similarly, a requester might provide other information about the expected use of compute units (e.g., a distribution or curve indicating that less processing power will be needed during each night). As a result, an administrator or automated process might more efficiently plan for how a pool 120 might be utilized.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method, comprising:
receiving, via processor, from a requestor a scope request including an indication of a number of compute units to be reserved for a scope, the compute units representing a quantifiable parameter associated with processing machines that define an amount of processing power;
receiving, via the processor, an application request associated with the scope, wherein the scope request includes an indication of a subscription period;
determining, via the processor, a requested number of compute units for the application request;
allocating, via the processor, the requested number of compute units and an additional number of compute units for the application request, wherein allocating comprises allocating at least one of any available processing machines from a pool of processing machines having the requested number of compute units and the additional number of compute units to the application request, and wherein other processing machines from the pool are allocated to other application requests associated with other scopes;
dividing, via the processor, the application request into a plurality of tasks;
associating, via the processor, a deadline with each task;
assigning, via the processor, each task to one of the allocated processing machines;
if a processing machine does not complete the task before the deadline, reassigning, via the processor, the task to another allocated processing machine; and
allocating, via the processor, a cost to the requestor, wherein the allocated cost is based at least in part on a number of compute units reserved for the scope and a cost-per-compute unit computed by dividing an overall cost associated with the entire pool of processing machines by a total number of compute units representing the processing power associated with all of the processing machines.

2. The method of claim 1, further comprising determining a number of processing machines to be provided in the entire pool of processing machines based on scope requests from a plurality of requestors.

3. The method of claim 1, wherein the cost allocated to the requestor is further based on the subscription period.

4. The method of claim 1, wherein the scope request further includes an indication of a time period associated with compute units to be reserved for the scope.

5. The method of claim 4, wherein the time period is associated with at least one of: (i) a time of day, (ii) a time of month, (iii) a time of year.

6. The method of claim 1, wherein the number of compute units reserved for the scope represents a maximum number of compute units that can be assigned to the scope at one time.

7. The method of claim 6, further comprising:
determining if a total number of compute units currently assigned to the scope exceeds the number of compute units reserved for the scope.

8. The method of claim 1, wherein the number of compute units reserved for the scope represents a maximum number of compute unit time increments that can be assigned to the scope over a time period.

9. The method of claim 8, further comprising:
determining if a total number of compute unit time increments that have been used by the scope exceeds the number of compute unit time units reserved for the scope.

10. The method of claim 1, wherein said dividing is performed by at least one of:
(i) a programmer, (ii) an administrator, and (in) an automated scheduling/distribution manager.

11. The method of claim 1, wherein the overall cost associated with the entire pool of processing machines includes at least one of: (i) a capital cost, (ii) an occupancy cost, (iii) a power cost, (iv) a cooling cost, and (v) an administrative cost.

12. The method of claim 1, wherein the application request is associated with a financial application.

13. The method of claim 1, wherein the requestor is remote from the processing machines.

14. The method of claim 1, where the processing machines comprise boards in a processing cabinet.

15. The method of claim 1, wherein the application is at least one of (i) resilient, and (ii) free of dependencies on a fixed machine address.

16. A non-transitory computer-readable medium storing instructions that when executed by a processor performs a method, said method comprising:
receiving from a requestor a scope request including an indication of a number of compute units to be reserved for the scope, the compute units representing a quantifiable parameter associated with processing machines that define an amount of .processing power;
receiving an application request associated with the scope, wherein the scope request includes an indication of a subscription period;
determining a requested number of compute units for the application request;
allocating, via the processor, the requested number of compute units and an additional number of compute units for the application request, wherein allocating comprises allocating at least one of any available processing machines from a pool of processing machines having the requested number of compute units and the additional number of compute units to the application request, and wherein other processing machines from the pool are allocated to other application requests associated with other scopes;
dividing, via the processor, the application request into a plurality of tasks;
associating, via the processor, a deadline with each task;
assigning, via the processor, each task to one of the allocated processing machines;
if a processing machine does not complete the task before the deadline, reassigning, via the processor, the task to another allocated processing machine; and
allocating a cost to the requestor, wherein the allocated cost is based at least in part on a number of compute units reserved for the scope and a cost-per-compute unit computed by dividing an overall cost associated with the entire pool of processing machines by a total number of compute units representing processing power associated with all of the processing machines.

17. The medium of claim 16, wherein the method further comprises:
determining processing machines to be provided in the entire pool of processing machines based on scope requests from a plurality of requesters.

18. The medium of claim 16, wherein the cost allocated to the requester is further based on the subscription period.

19. The medium of claim 16, wherein the overall cost associated with the entire pool of processing machines includes at least one of: (i) a capital cost, (ii) an occupancy cost, (iii) a power cost, (iv) a cooling cost, and (v) an administrative cost.

20. The medium of claim 16, wherein the application request is associated with a financial transaction.

21. The medium of claim 16, wherein the requester is remote from the processing machines.

22. A scheduling/distribution manager, comprising:
a processor; and
a storage device in communication with said processor and storing instructions that when executed by said processor, causes the processor to:
receive from a requestor a scope request including an indication of a number of compute units to be reserved for a scope, the compute units representing a quantifiable parameter associated with processing machines that define an amount of processing power for the processing machines based on a number of processors, processor speed, an amount of memory, and hard disk drive storage;
receive an application request associated with the scope, wherein the scope request includes an indication of a subscription period;
determine a requested number of compute units for the application request;
allocate the requested number of compute units and an additional number of compute units for the application request, wherein allocating comprises allocating at least one of any available processing machines from a pool of processing machines having the requested number of compute units and the additional number of compute units to the application request, and wherein other processing machines from the pool are allocated to other application requests associated with other scopes;
divide the application request into a plurality of tasks;
associate a deadline with each task;
assign each task to one of the allocated processing machines;

if a processing machine does not complete the task before the deadline, reassign the task to another allocated processing machine; and allocate a cost to the requestor, wherein the allocated cost is based at least in part on a number of compute units reserved for the scope and a cost-per-compute unit computed by dividing an overall cost associated with the entire pool of processing machines by a total number of compute units representing the processing power associated with all of the processing machines.

23. A system, comprising:

a processing machine pool; and a scheduling/distribution manager, comprising:

a processor; and a storage device in communication with said processor and storing instructions when executed by said processor, causes the processor to:

receive from a requestor a scope request including an indication of a number of compute units reserved for a scope, the compute units representing a quantifiable parameter associated with processing machines that define an amount of processing power;

receive an application request associated with the scope, wherein the scope request includes an indication of a subscription period;

determine a requested number of compute units for the application request;

allocate the requested number of compute units and an additional number of compute units for the application request, wherein allocating comprises allocating at least one of any available processing machines from a pool of processing machines having the requested number of compute units and the additional number of compute units to the application request, and wherein other processing machines from the pool are allocated to other application requests associated with other scopes;

divide the application request into a plurality of tasks;

associate a deadline with each task;

assign each task to one of the allocated processing machines;

if a processing machine does not complete the task before the deadline, reassign the task to another allocated processing machine; and allocate a cost to the requestor, wherein the allocated cost is based at least in part on a number of compute units reserved for the scope and a cost-per-compute unit computed by dividing an overall cost associated with the entire pool of processing machines by a total number of compute units representing the processing power associated with all of the processing machines.

* * * * *